United States Patent
Söderkvist et al.

(10) Patent No.: US 6,295,290 B1
(45) Date of Patent: Sep. 25, 2001

(54) TELECOMMUNICATIONS SYSTEMS

(75) Inventors: Jan Erik Söderkvist, Enebyberg; Lars Peter Wahlström, Bromma, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/995,541

(22) Filed: Dec. 22, 1997

(30) Foreign Application Priority Data

Dec. 23, 1996 (GB) .................................................. 9626681

(51) Int. Cl.[7] ........................................................ H04J 3/16
(52) U.S. Cl. ................................................................ 370/347
(58) Field of Search ........................ 370/321, 324, 370/332, 333, 336, 337, 343, 345, 347, 350, 442, 468, 498, 503, 509, 510, 511, 512, 513–515, 344, 341, 326, 319, 311, 317; 455/422, 501, 502, 516, 517, 524, 528, 63, 62, 65, 66

(56) References Cited

U.S. PATENT DOCUMENTS

| | | | |
|---|---|---|---|
| 5,329,558 | 7/1994 | Larsson et al. | 375/114 |
| 5,343,498 | 8/1994 | Toy et al. | 375/37 |
| 5,528,597 | 6/1996 | Gerszberg et al. | |
| 5,666,366 | * 9/1997 | Malek et al. | 370/503 |
| 5,715,240 | * 2/1998 | Borras et al. | 370/332 |
| 5,721,762 | * 2/1998 | Sood | 455/466 |
| 5,802,076 | * 9/1998 | Weigand et al. | 375/346 |
| 5,822,313 | * 10/1998 | Malek et al. | 370/332 |

FOREIGN PATENT DOCUMENTS

| | | |
|---|---|---|
| 0 257 110 | 3/1988 | (EP) . |
| 0 286 614 | * 12/1988 | (EP) . |
| WO94/28643 | 12/1994 | (WO) . |

OTHER PUBLICATIONS

British Search Report Under Section 17 re GB 9626681.2 Date of Search: Mar. 14, 1997.

* cited by examiner

Primary Examiner—Dang Ton
(74) Attorney, Agent, or Firm—Burns, Doane, Swecker & Mathis, L.L.P.

(57) ABSTRACT

A base station monitors signals received from cochannel interferers, and detects the air frame positions of the interfering transmissions. The base station then adjusts the air frame position of its own transmissions such that it minimizes the possibility of interference with the cochannel interferers.

25 Claims, 3 Drawing Sheets

TELECOMMUNICATIONS SYSTEMS

TECHNICAL FIELD OF THE INVENTION

The present invention relates to a method of controlling synchronisation of a radio transmitter compared with other receivers in a network, in order to minimise the effect of interference from other transmitters. In particular, the invention relates to the synchronisation of a network of base stations in a mobile communications system.

DESCRIPTION OF RELATED ART

In a digital cellular radio system which operates in accordance with the TDMA-principle, such as GSM, D-AMPS or PDC, radio messages are transmitted in frames from base stations, each frame including a given number of time slots. Transmissions in the different time slots are generally intended to be received by different mobile radio receivers, and so it is necessary to ensure that the receiver is synchronised with the transmitter. The mobile transceivers are synchronised to their respective base stations by a signal from the base station.

For example, in full-rate D-AMPS, three mobile receivers share the same frequency channel, and therefore each channel is divided into three time slots, each lasting 6.7ms, three time slots forming a frame. The frames are repeated 50 times per second.

Each time slot in the frame is assigned to a particular mobile receiver, until either the call is released, or the mobile is handed over to another channel, for example in another cell.

In each time slot, 324 bits are transmitted, most of which are data bits, but 28 of which form a synchronisation word.

The standard published by the Electronics Industries Association as EIA/TIA Publication IS136, which specifies the D-AMPS system, defines six different synchronisation words, but only three of those are used for a channel running at full-rate. Thus, a different synchronisation word is allocated to each time slot in a frame, and the base station transmits the relevant synchronisation word once during each time slot. The mobile receiver is able to recognise transmissions intended for it by identifying the synchronisation word, and similarly includes the same synchronisation word in its own transmissions to the base station.

The synchronisation words in IS136 are chosen such that there is minimal correlation between them. Thus, there is only a very small chance that a receiver will mis-identify a transmitted synchronisation word with a different synchronisation word. A danger, however, is that a receiver will receive the expected synchronisation word from an interfering transmitter operating on the same frequency, and will falsely interpret it as its expected synchronisation word.

Attempts have been made in the prior art to overcome these problems.

One known possibility is simply to allow each base station transceiver to select its own timing, independently of other base stations, meaning that there is no synchronisation between the base stations. In this situation, it is possible that an interfering transmitter will be transmitting the same synchronisation word with a signal level sufficient to cause interference, and at a point in time sufficiently close to the expected time to give the possibility of false synchronisation.

An alternative known possibility is to synchronise the entire network, such that every base station is transmitting the same synchronisation word at the same time. This in fact increases the probability that the base station will falsely receive the synchronisation word from an interfering transmitter, and interpret it as its own expected synchronisation word.

The probability of a false identification in this way depends on the carrier/interference (C/I) ratio, which relates to the relative signal levels of the transmissions from a desired transmitter, and from an interfering transmitter operating on the same frequency. Because there are only a limited number of frequencies available for use in a system, it is necessary to re-use the frequencies. Frequency planning can maximise the frequency re-use distance, and hence maximise the C/I ratio, but in general cannot guarantee that the C/I ratio will be high enough to avoid any possibility of interference by falsely detecting the synchronisation word from an interfering transmitter.

SUMMARY OF THE INVENTION

The invention relates to a method of operation of a base station transceiver, in which the transceiver detects signals from interfering transmitters, and selects its own air frame position, namely the time at which sync word 1 is transmitted, such that the possibility of falsely detecting a synchronisation word from a cochannel interferer is minimised.

The invention also relates to the transceiver itself, and to a base station incorporating a transceiver.

DETAILED DESCRIPTION OF THE INVENTION

Figure 1:
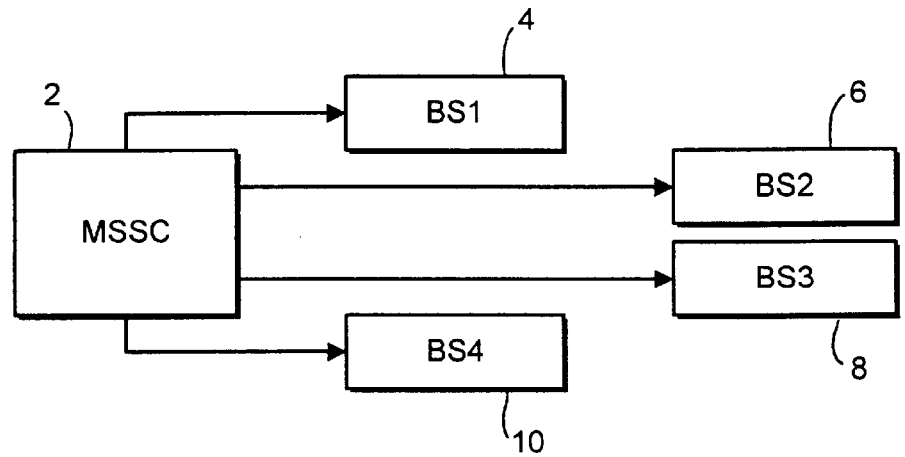
FIG. 1 is a schematic representation of a part of a telecommunications network in accordance with the invention.

FIG. 1 shows a network in which a mobile services switching center MSSC 2 is connected to, and controls the operation of, four base stations 4, 6, 8, 10, also referred to herein as BS1, BS2, BS3 and BS4. It will be appreciated that a practical network is likely to involve many more such base stations, but four are sufficient to allow the invention to be described.

Figure 2:
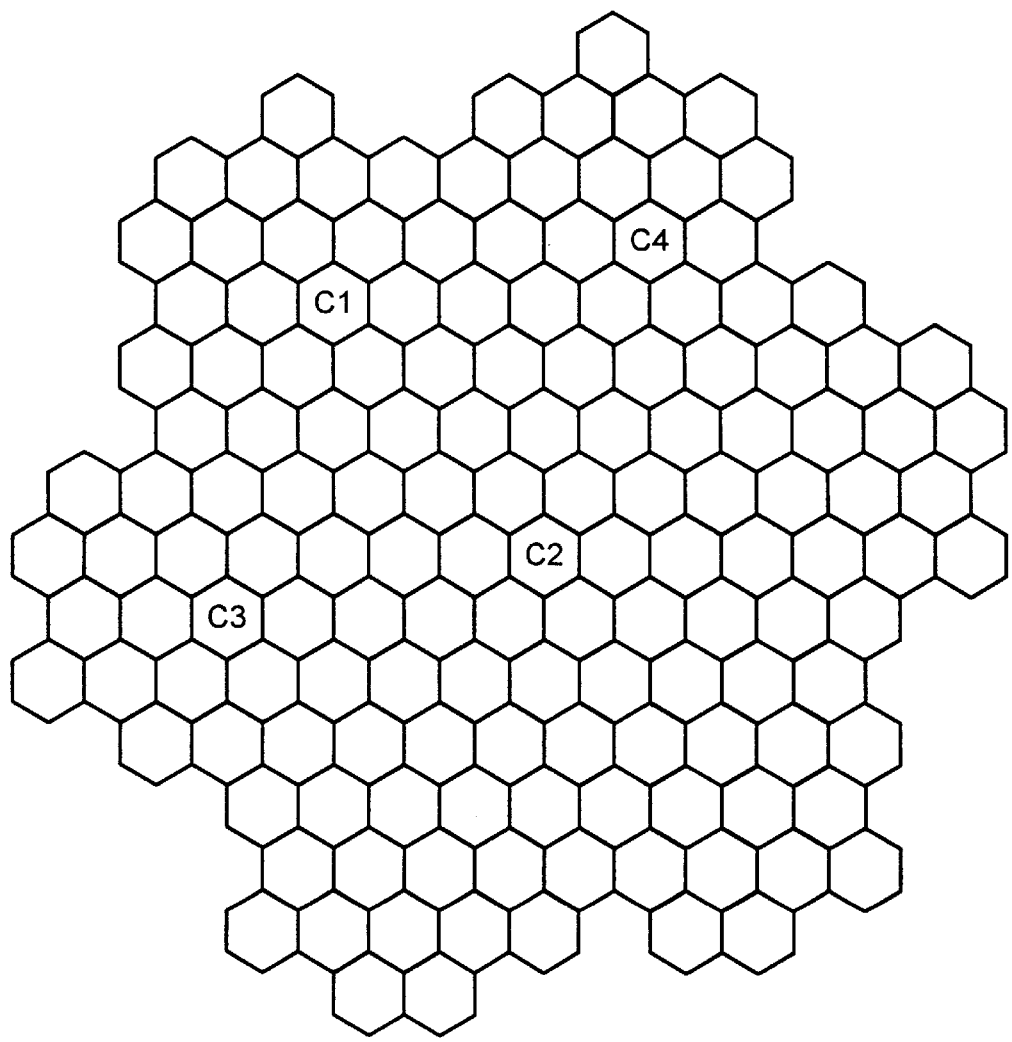
FIG. 2 shows an area covered by the network of FIG. 1.

FIG. 2 represents an area to be covered by the network. The area is shown as being divided into generally hexagonal cells, each of which contains a respective base station. Each base station transmits on a particular operating frequency, but, because of the limited availability of suitable frequencies, each frequency must be reused in more than one cell. In the network shown in FIG. 2, cells C1, C2, C3 and C4 contain base stations BS1, BS2, BS3 and BS4 respectively, which all operate on the same frequency.

As shown, these cells must be as widely spaced as possible, to minimise the possibility that transmissions from one base station will be detected by a mobile in one of the cells associated with the other base stations. These other base stations, and the mobiles connected to them, are referred to in this context as cochannel interferers, and the ratio of the strength of the signal from the base station with which the mobile is in communication to the signal strength from the other base stations is referred to as the C/I, or carrier/interference, ratio.

Figure 3:
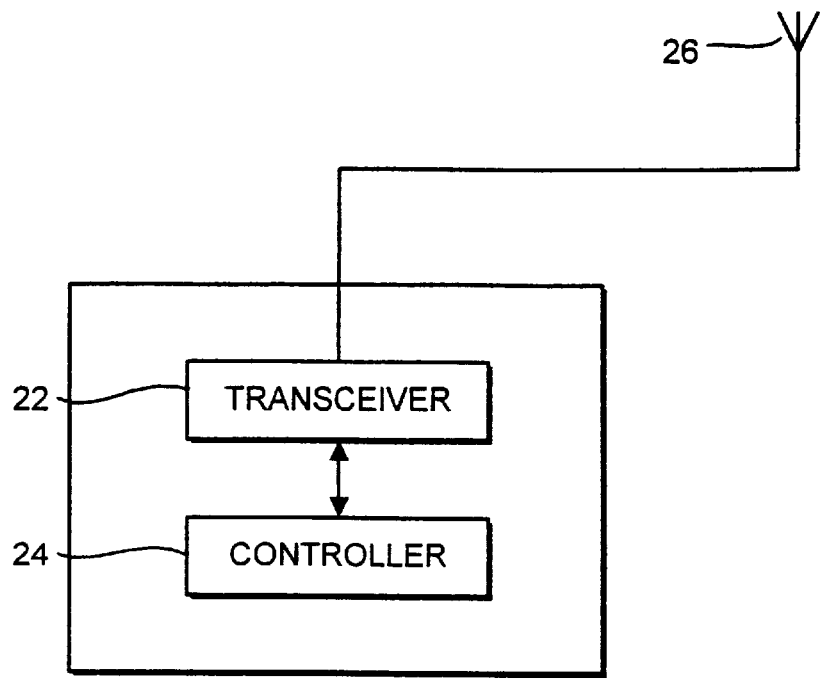
FIG. 3 represents a base station in accordance with the invention.

FIG. 3 is a schematic representation of one of the base stations BS1–BS4, and the general form of the base station is well known to the person skilled in the art. The base station includes the transceiver 22, in communication with a controller 24, and sending signals to, and receiving signals from an antenna 26. The controller 24 analyses signals received by the transceiver 22, and controls its operation.

In a typical system, each transceiver divides its transmissions into time slots, and communicates with a different mobile during each time slot. For example, one frame, lasting 20ms, may be divided into three time slots. To allow the mobiles to determine which signals from the transceiver are intended for them, the transceiver transmits during each time slot a synchronising word, or sync word. When communications are divided into three time slots, there are three sync words, which are selected such that they have minimal correlation, and hence there is an extremely small probability that a mobile will detect an incorrect sync word, and falsely interpret it as the sync word which it is expecting. It is rather more likely that the mobile will detect the expected sync word transmitted from one of the other base stations operating on the particular frequency, and act on the data transmitted with that erroneous sync word.

In some prior art systems, the transceivers 22 in the base stations are controlled from the MSSC 2, such that their air frame positions are synchronised. That is, transmissions from all of the transceivers in the network are synchronised such that each transceiver begins a new time slot at the same moment as each other base station transceiver. As a result, each base station transceiver is transmitting a sync word at the same moment as each other base station transceiver. This means that, when a mobile is expecting to receive a sync word from the base station with which it is in communication, other base stations operating on the same frequency will also be transmitting sync words. If those other base stations are transmitting different sync words, then the possibility of falsely interpreting one of those sync words is very low because of the minimal correlation between the sync words, as mentioned previously. However, if one of the cochannel interferers is transmitting the sync word that the mobile is expecting to receive, there is a danger that it will be falsely interpreted as being the sync word from the base station with which the mobile is in communication. As mentioned above, there are only three sync words available for use, and so there is a significant probability that one of the cochannel interferers will be transmitting the expected sync word at the expected time.

In accordance with the present invention, each base station is able to adjust its own air frame position, to avoid the possibility that mobiles connected to the base station will falsely detect interfering sync words from cochannel interferers.

Figure 4:
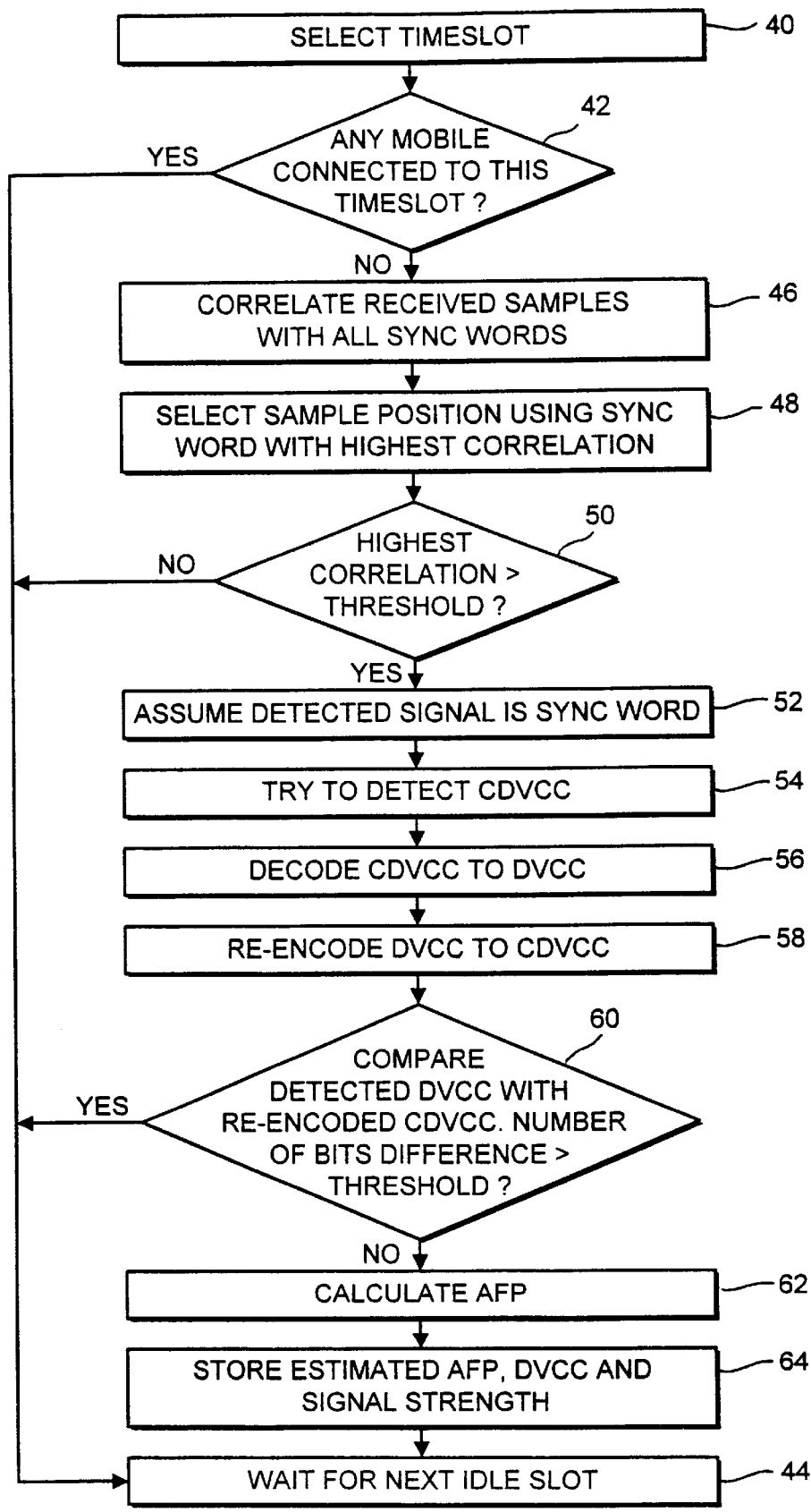
FIG. 4 is a flow chart showing a process used by the base station controller to obtain data used in a method in accordance with the invention.

FIG. 4 is a flow chart showing the process carried out by the base station controller.

In the first step, step 40, the controller selects one of the time slots of the transceiver, and, in step 42, it determines whether any mobile is connected to this time slot. If there is a mobile connected to the time slot, the process moves to step 44, and the controller waits for the next time slot. If no mobile is connected to the time slot under consideration, the process moves to step 46, in which it detects signals transmitted by one of the cochannel interferers. Specifically, it detects signals received from mobiles connected to another base station transceiver during the period of one time slot. The aim is to determine the air frame position of that other transceiver, that is, the point in time at which it transmits sync word 1, which can be considered to be the start of a frame.

The controller will know that, during one time slot, the other transceiver will transmit one sync word, but it will not know which of the three sync words to expect, and, because of the lack of synchronisation between the transceivers, it will not know when during its own time slot to expect the sync word from the other transceiver.

During a time slot, a base station transmits 324 bits, most of which are data, but 28 of which make up the sync word. Thus, in step 46, the controller attempts to correlate the received data with all three of the available sync words. Then, in step 48, the sample which has the highest correlation with one of the three sync words is selected. In step 50, it is determined whether this degree of correlation, between the sample which most closely correlates with one of the sync words, and that sync word, is higher than a threshold value. If it is not, it is decided that no reliable estimation can be made of the airframe position for that cochannel interferer, and the process passes to step 44 again. If no reliable estimation can be made, this may be because the signal strength for that cochannel interferer is very low, meaning that the other transceiver is a very weak interferer, which is unlikely to cause any problems. For example, there may be no dominant interferer.

If the degree of correlation measured in step 50 is indeed greater than a threshold, it is assumed in step 52 that the detected signal, that is the sample of 28 bits which is most closely correlated with one of the sync words, is a sync word, but it is advantageous to verify that this is indeed a signal from a mobile.

This verification is achieved by using the fact that signals transmitted by mobiles also include, during each time slot, at a known position relative to the sync word, a coded digital voice channel colour code (CDVCC), which is unique to the particular base station. The CDVCC is a coded version of the digital voice channel colour code (DVCC), which is made up of 8 bits, the CDVCC containing 4 CRC bits.

As mentioned above, the time position of the CDVCC in the transmission is known relative to the time position of the sync word. Thus, in step 54 of the process, the bits appearing at that known position, assuming the detected sample is a sync word, are assumed to be a CDVCC.

It is then necessary to test whether this detected code does in fact represent a CDVCC, or whether it is simply noise, which would indicate that the detected sample does not represent a sync word, and hence that it has not been possible to estimate the airframe position of the cochannel interferer.

In step 56, the detected CDVCC is decoded to form a presumed DVCC, and in step 58 that DVCC is re-encoded to form a CDVCC.

In step 60, the originally detected CDVCC is then compared with the re-encoded version obtained in step 58. If there is a good correlation between the two, for example if the number of bits difference does not exceed a threshold, it is then finally assumed that the detected signal was a CDVCC, and hence that the previously detected signal did represent a sync word. The process then passes to step 62.

If, in step 60, the number of bits difference between the re-encoded CDVCC and the originally detected CDVCC exceeds a threshold, it is assumed that this is because the originally detected CDVCC did not in fact represent a CDVCC, but was merely data received erroneously from the cochannel interferer. In that case, it is again decided that the airframe position cannot be determined, and the process passes to step 44.

If the process passes to step 62, that is, if it is determined that a sync word, followed at the appropriate interval by a CDVCC, has been detected, the airframe position (AFP) of the cochannel interferer is calculated, using the position of the detected sync word relative to the start of the time slot under consideration, and using the fact that the sync words occur in a known sequence. Then, in step 64, the calculated AFP, the DVCC representative of the cochannel interfering base station, and the signal strength received from that base station, are stored. Finally, the process passes to step 44, and can be repeated in any other idle time slots.

It will be appreciated that steps 54–60 may be omitted, and that any sample which is well correlated with one of the sync words can be assumed to be a sync word. While reducing the complexity of the system, this increases the probability that false data will be stored.

When the process set out in FIG. 4 has been carried out for all detected cochannel interferers, and stored in the database, the controller 24 of the base station then attempts to select an AFP for its own transmission, to minimise the risk that mobile stations receiving its transmission will receive interfering sync words from the interfering mobile stations.

For example, referring to the network shown in FIG. 2, it is assumed that the controller 24 of base station BS4 in cell C4 is carrying out the process set out in FIG. 4.

Figure 5A:
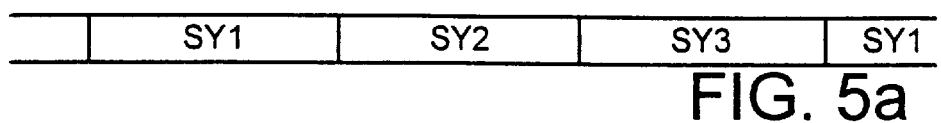
FIGS. 5a–5d represent signals transmitted by the base stations forming part of the network shown in FIG. 1.
Figure 5B:
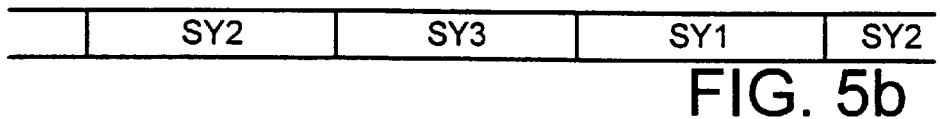
Figure 5C:
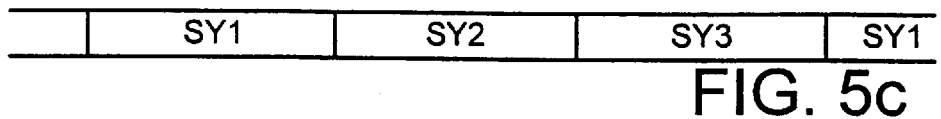

FIGS. 5a, 5b and 5c show the calculated air frame positions of the transmissions from base stations BS1, BS2 and BS3 in cells C1, C2 and C3 respectively. Thus, FIGS. 5a, 5b and 5c each show a frame of transmissions from the respective base stations, with the time slots identified by the sync words SY1, SY2 or SY3 which are transmitted during those time slots.

Moreover, it will be noted from FIG. 2 that cell C4 is considerably closer to cell C1 and C2 than it is to cell C3. This means that it is likely that the strength of the signal received from cell C3 is significantly less than the strength of the signals received from cell C1 and C2, and it is assumed for the purposes of this discussion that that is so.

Figure 5D:
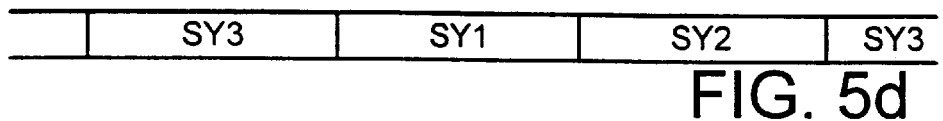

Thus, when selecting the air frame position for transmissions from base station BS4, the controller 24 thereof might determine that it would be possible to minimise the risk of interference if it transmits the sync word SY1 at approximately the same time as base station BS1 is transmitting the sync word SY2, and base station BS2 is transmitting the sync word SY3, as shown in FIG. 5d. In this illustrated example, the air frame position of base station BS4 is also noticeably different from the air frame position of base station BS3, and so there is also only a small probability that transmissions from these two base stations will interfere. The acceptability of this risk will depend upon the signal strength from base station BS3 detected at base station BS4.

Once an appropriate air frame position for transmissions from BS4 has been determined by the controller 24, it may then need to adjust the air frame position. This may be achieved in one of two ways.

One possibility is that, if all time slots are idle, i.e. no mobiles are connected to the base station, it is possible simply to turn off the base station transmitter and then to determine the optimal air frame position by referring to the database of information relating to the cochannel interferers, whenever the transmitter is to be restarted.

Alternatively, the air frame position can be adjusted while at least some time slots are busy, by slowly changing the lengths of the time slots, that is, by slowly altering the time position of the sync word in the desired direction. Provided the change is made sufficiently slowly, this will simply be detected by the mobile as a change in the path delay.

As a result, the air frame positions of the base stations can be changed, to ensure that interference between the base stations is minimised.

The method has been described herein as carried out in a base station. The same method can be carried out partly in a mobile device. For example, the measurements can be carried out in a mobile device and reported to a base station, which then calculates the AFP of the cochannel interferers, and determines the optimal AFP for its own transmissions. Alternatively, the mobile device can calculate the AFP of the cochannel interferers, and report the results to the base station.

What is claimed is:

1. A transceiver, for receiving and transmitting signals on an operating frequency, the transceiver including a controller which operates to:

control the transceiver to detect interfering transmissions on the operating frequency;

calculate air frame positions of said interfering transmissions; and select an air frame position for transmissions from the transceiver to reduce the possibility of interference between transmissions from mobiles connected to the transceiver and the detected interfering transmissions.

2. A transceiver as claimed in claim 1, wherein the controller calculates the air frame positions for said interfering transmissions by:

correlating a received signal with all available sync words, and determining the highest degree of correlation between any part of the received signal and any one of the available sync words.

3. A transceiver as claimed in claim 2, wherein the controller calculates the air frame positions for said interfering transmissions by, further:

comparing the highest determined degree of correlation with a first threshold value.

4. A transceiver as claimed in claim 3, wherein the controller calculates the air frame positions for said interfering transmissions by, further:

searching for a colour code at a predetermined location relative to the part of the received signal giving rise to the highest determined degree of correlation.

5. A transceiver as claimed in claim 4, wherein the controller calculates the air frame position for said interfering transmission by, further:

decoding and re-encoding a detected colour code, and comparing the detected and re-encoded colour codes, and, only if the difference between the detected and re-encoded colour codes is less than a second threshold value, determining that the data is a colour code, and hence determining that the part of the received signal giving rise to the highest determined degree of correlation between the part of the received signals and the one of the available sync words is a sync word, and hence calculating the air frame position of the interfering transmission on the basis thereof.

6. A transceiver as claimed in claim 1, wherein the controller controls the transceiver to detect interfering transmissions in each idle time slot.

7. A transceiver as claimed in claim 1, wherein the air frame positions of all received interfering transmissions are calculated.

8. A transceiver as claimed in claim 1, wherein the air frame position is set to a desired position when the transceiver begins transmissions.

9. A transceiver as claimed in claim 1, wherein the air frame position is adjusted during transmission from the transceiver.

10. A base station, comprising one or more transceivers as claimed in claim 1.

11. A telecommunications network, comprising a plurality of base stations as claimed in claim 10.

12. A method of controlling a transceiver, for receiving and transmitting signals on an operating frequency, the method comprising:

controlling the transceiver to detect interfering transmissions on the operating frequency;

calculating air frame positions of said interfering transmissions; and selecting an air frame position for transmissions from the transceiver to reduce the possibility of interference between transmissions from mobiles connected to the transceiver and the detected interfering transmissions.

13. A method as claimed in claim 12, comprising calculating the air frame positions for said interfering transmissions by:

correlating a received signal with all available sync words, and determining the highest degree of correlation between any part of the received signal and any one of the available sync words.

14. A method as claimed in claim 13, comprising calculating the air frame positions for said interfering transmissions by, further:

comparing the highest determined degree of correlation with a first threshold value.

15. A method as claimed in claim 14, comprising calculating the air frame positions for said interfering transmissions by, further:

searching for a colour code at a predetermined location relative to the part of the received signal giving rise to the highest determined degree of correlation.

16. A method as claimed in claim 15, comprising calculating the air frame position for said interfering transmission by, further:

decoding and re-encoding a detected colour code, and comparing the detected and re-encoded colour codes, and, only if the difference between the detected and re-encoded colour codes is less than a second threshold value, determining that the data is a colour code, and hence determining that the part of the received signal giving rise to the highest determined degree of correlation between the part of the received signals and the one of the available sync words is a sync word, and hence calculating the air frame position of the interfering transmission on the basis thereof.

17. A method as claimed in claim 12, comprising controlling the transceiver to detect interfering transmissions in each idle time slot.

18. A method as claimed in claim 12, comprising calculating the air frame positions of all received interfering transmissions.

19. A method as claimed in claim 12, comprising setting the air frame position to a desired position when starting to transmit signals.

20. A method as claimed in claim 12, comprising adjusting the air frame position during transmissions.

21. A base station operating on a first frequency, for use in a telecommunications network having a plurality of base stations, at least some of which also operate on the first frequency, the base station programmed to:

monitor transmissions from mobile devices which are in communication with other base stations operating on the first frequency, calculate air frame positions of the monitored transmissions, and select an air frame position for its own transmissions on the basis of the calculated air frame positions of the monitored transmissions.

22. A base station as claimed in claim 21, wherein the base station is programmed to select an air frame position for its own transmissions to minimise the possibility of false detection of signals from other base stations operating on the first frequency.

23. A method of operation of a base station forming part of a cellular telecommunications network, the base station operating on a first frequency, and the network also comprising a plurality of other base stations operating on the first frequency, the method comprising:

monitoring transmissions from mobile devices in communication with the other base stations operating on the first frequency, determining air frame positions of the monitored transmissions, and selecting an air frame position for transmissions from said base station to minimize the possibility of a false detection of a sync word from one of said other base stations.

24. A base station, for use in a cellular communications network comprising a plurality of such base stations, the base station comprising:

a transceiver operating on a predetermined frequency, said transceiver being one of a plurality of transceivers in the network operating on said predetermined frequency, wherein the transceiver measures a signal strength of transmissions received from other transceivers operating on said predetermined frequency, and determines air frame positions of the received transmissions, and wherein the transceiver adjusts the air frame position of its own transmissions on the basis of the measured signal strengths and the air frame positions of the received transmissions.

25. A method of operation of a base station in a cellular communications network comprising a plurality of such base stations, the base station comprising a transceiver operating on a predetermined frequency, and being one of a plurality of transceivers in the network operating on said predetermined frequency, the method comprising:

measuring a signal strength of transmissions received from other transceivers operating on said predetermined frequency;

determining air frame positions of the received transmission; and adjusting the air frame position of transmissions from the transceiver on the basis of the measured signal strengths and the air frame positions of the received transmissions.

* * * * *